(12) United States Patent
Tse et al.

(10) Patent No.: US 6,973,193 B1
(45) Date of Patent: Dec. 6, 2005

(54) FAN AND COMPRESSOR NOISE ATTENUATION

(75) Inventors: Man-Chun Tse, Brossard (CA); André LeBlanc, St. Bruno (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 09/514,141

(22) Filed: Feb. 28, 2000

(30) Foreign Application Priority Data

Dec. 22, 1999  (CA)  ..................................... 2293076

(51) Int. Cl.⁷ .............................................. H04R 5/00
(52) U.S. Cl. ...................... 381/17; 381/71.1; 181/204; 415/119
(58) Field of Search ............................. 381/71.5, 71.1, 381/71.7–71.9, 71.13–71.14, 17; 181/207, 181/204, 213, 224; 415/119

(56) References Cited

U.S. PATENT DOCUMENTS

| | | | |
|---|---|---|---|
| 3,693,749 A * | 9/1972 | Motsinger et al. ......... 181/206 |
| 4,199,295 A | 4/1980 | Raffy et al. | |
| 4,255,083 A | 3/1981 | Andre et al. | |
| 4,805,733 A * | 2/1989 | Kato et al. .................. 181/206 |
| 5,182,774 A * | 1/1993 | Bourk ........................ 381/71.6 |
| 5,293,578 A * | 3/1994 | Nagami et al. .......... 381/71.14 |
| 5,478,199 A * | 12/1995 | Gliebe ......................... 415/119 |
| 5,515,444 A * | 5/1996 | Burdisso et al. ............ 381/71.5 |
| 5,692,702 A * | 12/1997 | Andersson ................. 244/1 N |
| 5,707,206 A | 1/1998 | Goto et al. | |
| 5,801,341 A | 9/1998 | Newell et al. | |
| 5,821,472 A * | 10/1998 | Zwernemann .............. 181/215 |
| 5,966,452 A * | 10/1999 | Norris ........................ 381/71.1 |
| 6,434,239 B1 * | 8/2002 | DeLuca ..................... 381/71.2 |

FOREIGN PATENT DOCUMENTS

EP              805431         11/1997

* cited by examiner

*Primary Examiner*—Vivian Chin
*Assistant Examiner*—Lun-See Lao
(74) *Attorney, Agent, or Firm*—Ogilvy Renault LLP

(57) ABSTRACT

An exciting sound wave generator is positioned within a nacelle of a jet engine at its inlet to generate an exciting sound wave having a primary frequency generally different from a frequency of the primary tone of the noise. The exciting sound wave is used to modulate the primary tone of the noise and, therefore, distribute sound energy of the noise from the primary tone to a broad range of side bands so that the amplitude of the primary tone of the noise is reduced.

11 Claims, 3 Drawing Sheets

US 6,973,193 B1

FAN AND COMPRESSOR NOISE ATTENUATION

TECHNICAL FIELD

The present invention relates to the field of noise deduction and, more particularly, to a system and method for reducing noise generated by a jet engine.

BACKGROUND OF THE INVENTION

Jet aircraft typically generates high noise levels that are radiated into the surrounding environment. This has been a significant negative factor associated with the commercial airline industry since the introduction of the aircraft gas turbine engine. The majority of sound radiated by the aircraft is created by the jet engines that power the aircraft. The current, modern day high bypass engine design includes nacelle surrounding the jet engine. The engine produces thrust by running a fan within the nacelle. A set of stator vanes are positioned in the nacelle, near the fan or compressor to stabilize the air flow created by the fan. The noise generated by the high bypass fan engine is largely a result of the interaction between the engine fan or compressor and the stator vanes and, to a lesser degree, the exhaust of the engine. The fan and compressor noise is mostly radiated from the engine inlet and the bypass duct.

A typical fan or compressor acoustic spectrum includes a broadband noise level and tones at the blade passage frequency (BPF) and its harmonics. These tones are usually ten to fifteen dB above the broadband level. Therefore, suppressing BPF tone of the jet engine noise will significantly reduce acoustic pollution to the environment. The blade passage frequency (BPF) depends on the number and rotating speed of the fan or compressor blades. The rotating speed of the fan or compressor depends upon whether the aircraft is taking off, landing or cruising at altitude. It is highly desirable to attenuate the engine noise generated when the aircraft is taking off or landing to reduce the noise generated around airports.

Efforts have been made in developing new methods and devices for suppressing the jet engine noise, especially the BPF tone. One option for jet engine noise reduction is to use a sound-absorbing liner in the nacelle surrounding the jet engine. The effectiveness of the noise reduction using a sound-absorbing liner, however, is limited by the lack of available space on the wall of the nacelle. In addition, the current trend in engine design is to increase the diameter of the engine while proportionality decreasing the length of the engine. In this design, the absorptive liners will become less effective.

Another option for engine noise reduction is to actively control the disturbing noise with a second control noise field. The concept of active sound control is described in U.S. Pat. No. 2,043,416 which issued to Leug for "PROCESS FOR SILENCING SOUND OSCILLATIONS". The principle behind active control of noise is the use of a second control noise field, created with multiple sources, to destructively interfere with the disturbing noise. The second control noise field must comprise a sound wave having the same frequency and out of phase in comparison with the sound wave of the noise. Therefore, complicated systems and devices are usually used in active noise control to measure the existing sound wave and create a phase-reversed mirror symmetry signal to generate an anti-noise sound wave. Examples are described in U.S. Pat. No. 5,386,689 to Bozich et al., which issued on Feb. 7, 1995 and U.S. Pat. No. 5,515,444 to Burdisso et al., which issued on May 7, 1996. Improvements on the active noise control is made in U.S. Pat. No. 5,952,621, issued to Curtis et al. on Sep. 14, 1999. Curtis describes a compact, lightweight sound attenuation system which includes an impedance device positioned in the nacelle to reflect a noise sound wave. The reflected sound wave is out of phase with the noise sound wave propagating from the noise source and destructively interfaces with the noise sound wave to attenuate the amplitude.

SUMMARY OF THE INVENTION

It is one object of the present invention to provide a new option for noise reduction which is distinct over the passive sound-absorbing linears and active noise control systems in the prior art.

It is another object of the present invention to provide a method and a system for reducing noise generated by a jet engine using tone modulation to re-distribute sound energy of the noise from a primary frequency of the noise to a broad range of side bands and, therefore, reduce the amplitude of the sound wave of the noise.

It is a further object of the present invention to provide a noise attenuation system which is relatively simple and enabled to effectively reduce the amplitude of BPF tone of the jet engine noise.

In accordance with one aspect of the present invention, a method for suppressing noise having a primary tone from a noise source within a duct housing comprises generating an exciting sound wave having a primary frequency generally different from a frequency of the primary tone of the noise, and modulating the primary tone of the noise using the generated exciting sound wave to excite within the duct housing a fluid medium in which a sound wave of the noise propagates so that sound energy of the noise is re-distributed from the frequency of the primary tone to a broad range of side bands and the amplitude of the primary tone of the noise is reduced.

The fluid medium is preferably air and the exciting sound wave is preferably generated by a force of fluid flow acting on a mechanical device.

In accordance with another aspect of the present invention, a system for suppressing noise having a primary tone from a noise source, comprises: an elongated housing surrounding the noise source, the housing having first and second openings on opposite ends, wherein the sound wave from the noise source propagates in air outwardly towards the first and second openings; and an exciting sound wave generator associated with the housing, the generator generating an exciting sound wave having a primary frequency generally different from a frequency of the primary tone of the noise to excite the air within the housing and modulate the primary tone of the noise so that sound energy of the noise is distributed from the frequency of the primary tone to a broad range of side bands and the amplitude of the primary tone of the noise is reduced.

The exciting sound wave generator is preferably positioned on an inner wall of the housing. The exciting sound wave generator, preferably comprises a mechanical device excited by a force of the air flow to generate the exciting sound wave.

Frequency modulation technology was originally developed for radio signal transmission. A single tone sound wave, similar to a single frequency radio signal, is a sine wave. In a sine wave, there are three parameters that can be varied: amplitude, frequency and phase. Amplitude and pulse modulations are achieved by varying the amplitude of a sine wave. Varying the frequency or phase of the sine wave generates Frequency Modulation (FM) or Phase Moderation (PM). In radio signal frequency modulation, the modulating signal changes the frequency of the carrier. The amplitude of the modulating signal determines how far (in frequency) the carrier signal will shift; this is referred to as the frequency deviation or ΔFdev. The frequency of the modulating signal determines how quickly the carrier signal will shift from one frequency to another; this is referred to as the modulation frequency or FM. For a given frequency deviation and a given rate of frequency change, the modulation index, called β is defined as ΔFdev/FM. Frequency modulation, depending on the modulation index β, can create a infinite number of side bands around the carrier signal. A mathematical solution to frequency modulation requires Bessell functions. The Bessell functions provide an indication of the number and relative strength of the side bands. In frequency modulation, the modulation effect on the amplitude of the carrier frequency always causes a decrease in this amplitude because the modulation energy is spread over the entire frequency spectrum. It is, therefore, also true that each amplitude of the frequencies within the infinite side bands is smaller than the amplitude of the carrier frequency. In a special case with the proper modulation index β, the carrier signal can completely disappear.

The principle of the frequency modulation is adopted, according to the present invention, to provide the new noise attenuation method for suppressing a noise having a primary tone. As the frequency modulation takes place in radio signal transmission, a second sound wave, acting as a modulating signal, will modulate the frequency of a single tone noise that acts as a carrier signal and, therefore, distributes sound energy of the noise from the frequency of the single tone to a broad range of side bands, so that the amplitude of the single tone of the noise is reduced. Even though, the sound energy of the noise does not disappear, it is shifted from a single tone noise to a noise having a very broad acoustic spectrum with relatively low amplitude at each frequency, which is much better for the environment and results in much less effect on human ears.

In frequency modulation, the frequency of a modulating signal is not required to be equal to the frequency of the carrier signal, and generally is different. The modulating signal has a maximum amplitude which is now a frequency variation of the carrier signal and is equal to the frequency deviation ΔFdev. In radio signal transmission, a device in the FM transmitter is needed to translate the harmonic signal current variation into a corresponding harmonic frequency variation. However, frequency modulation in fluid medium noise control may not need such a device because unlike the propagation of radio signals, the propagation of sound waves depends on a medium which is usually the atmosphere. Experience has shown that frequency modulation takes place when a fluid medium in which a first sound wave propagates is excited by second wave having a frequency different from the frequency of the first sound wave.

In accordance with a more specific embodiment of the present invention, a noise attenuation system for suppressing noise having a primary tone from a jet engine comprises a nacelle surrounding the jet engine, the nacelle having an inlet and outlet for receiving and exhausting air flow, respectively, wherein a sound wave of the noise produced from the jet engine propagates outwardly towards the inlet and outlet; and an exciting sound wave generator associated with the nacelle, generating an exciting sound wave having a primary frequency generally different from a frequency of the primary tone of the noise to excite the air flow in the nacelle and modulate the primary tone of the noise so that sound energy of the noise is distributed from the frequency of the primary tone to a broad range of side bands and the amplitude of the primary tone of the noise is reduced.

The exciting sound wave generator is preferably a mechanical device excited by a force of air flow to generate the exciting sound wave. In one embodiment of the present invention, the mechanical device comprises a fence member positioned on an inner wall of the nacelle at the inlet, and, therefore exposed to the air flow entering the inlet of the nacelle. The fence member is excited by the force of the air flow entering the inlet of the nacelle to generate the exciting sound wave. The amplitude and frequency of the exciting sound wave depend on the velocity of the air flow, the geometry and dimension of the fence member. The generated exciting sound wave then reacts on the air flow in the nacelle to excite the air flow in which the BPF tone noise propagates so that the frequency modulation of BPF tone sound wave takes place.

In another embodiment of the present invention, the mechanical device is an aperture defined in the inner wall of the nacelle at the inlet. An air flow is jetted from the aperture into the nacelle. Depending on the velocity of the jetted air flow, the geometry and dimension of the aperture, the exciting sound wave with a desired frequency and amplitude is generated and acts on the air flow from the atmosphere entering the inlet of the jet engine to cause the frequency modulation of the BPF tone noise. The frequency and amplitude of the exciting sound wave generated in this embodiment is easier to be adjusted because the jetted air flow is enabled to be controlled as desired. However, in the former embodiment, the fence member is excited by the air flow from the atmosphere entering the inlet of the engine, which depends upon whether the plane is taking off, landing or cruising at altitude. Any significant changes of the air flow entering the inlet of the jet engine will affect the performance of the engine, which may not be desired. Therefore, a desired range of the frequencies and amplitudes of the exciting sound wave is generally obtained by predetermining geometry and dimension of the fence member in a condition of the range in which the air flow changes.

The noise attenuation method and system according to the present invention provide a new option for suppressing the BPF tone of the jet engine noise, and avoids complicated devices currently used in most prior art active noise control systems for sensing the noise frequency and phase, and controlling the frequency and phase of the generated sound wave for a match.

BRIEF DESCRIPTION OF THE DRAWINGS

Having thus generally described the nature of the invention, the present invention will be better understood by way of the following description of the preferred embodiments of the invention, with reference to the accompanying drawings, in which.

DETAILED DESCRIPTION OF THE PREFERRED EMBODIMENT

Figure 1:
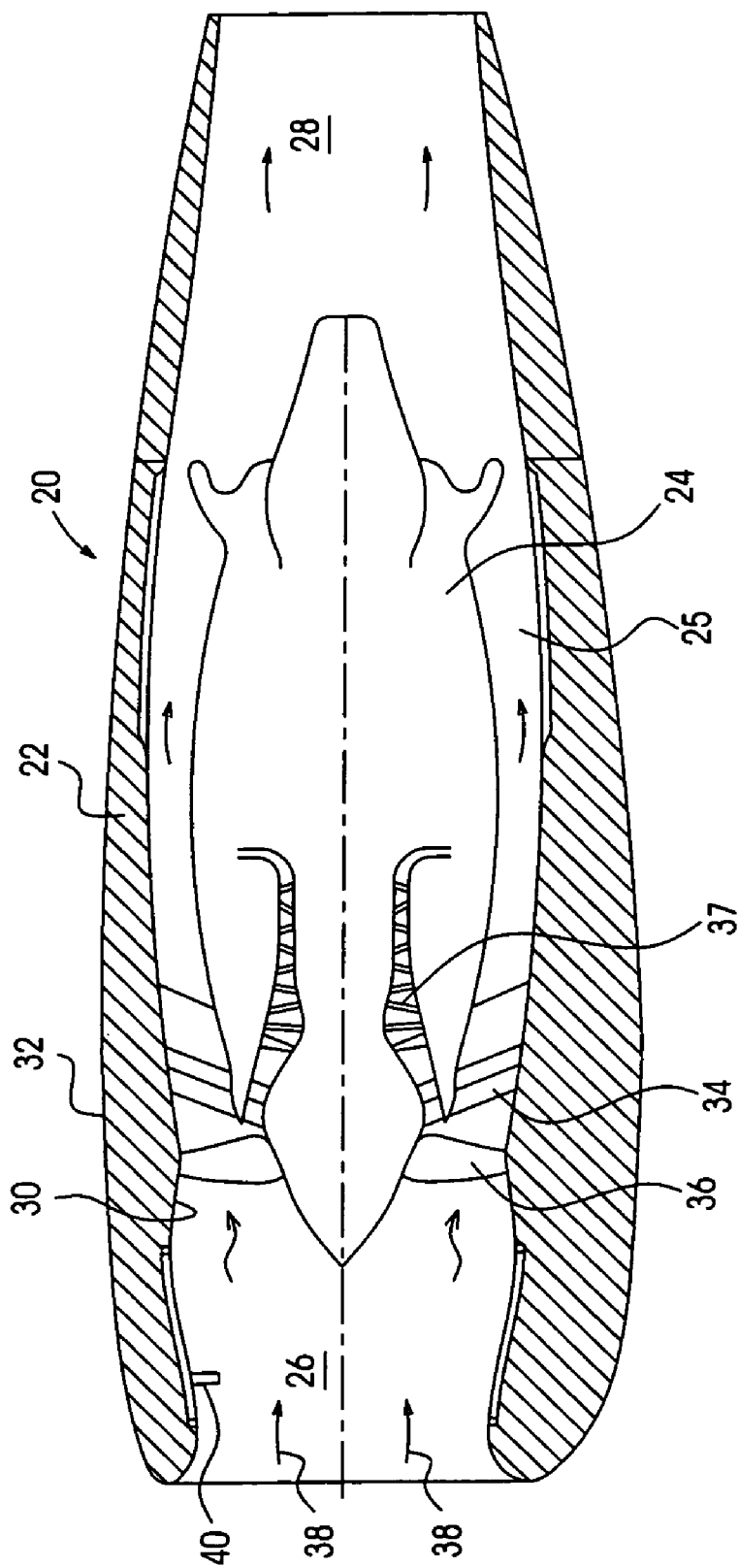
FIG. 1 is a schematic cross-sectional view of a jet engine assembly incorporating a first embodiment of the present invention.

Reference will now be made in detail to the presently preferred embodiments of the invention. Whenever possible, the same reference numerals will be used throughout the drawings to refer to the same or like parts.

Figure 2:
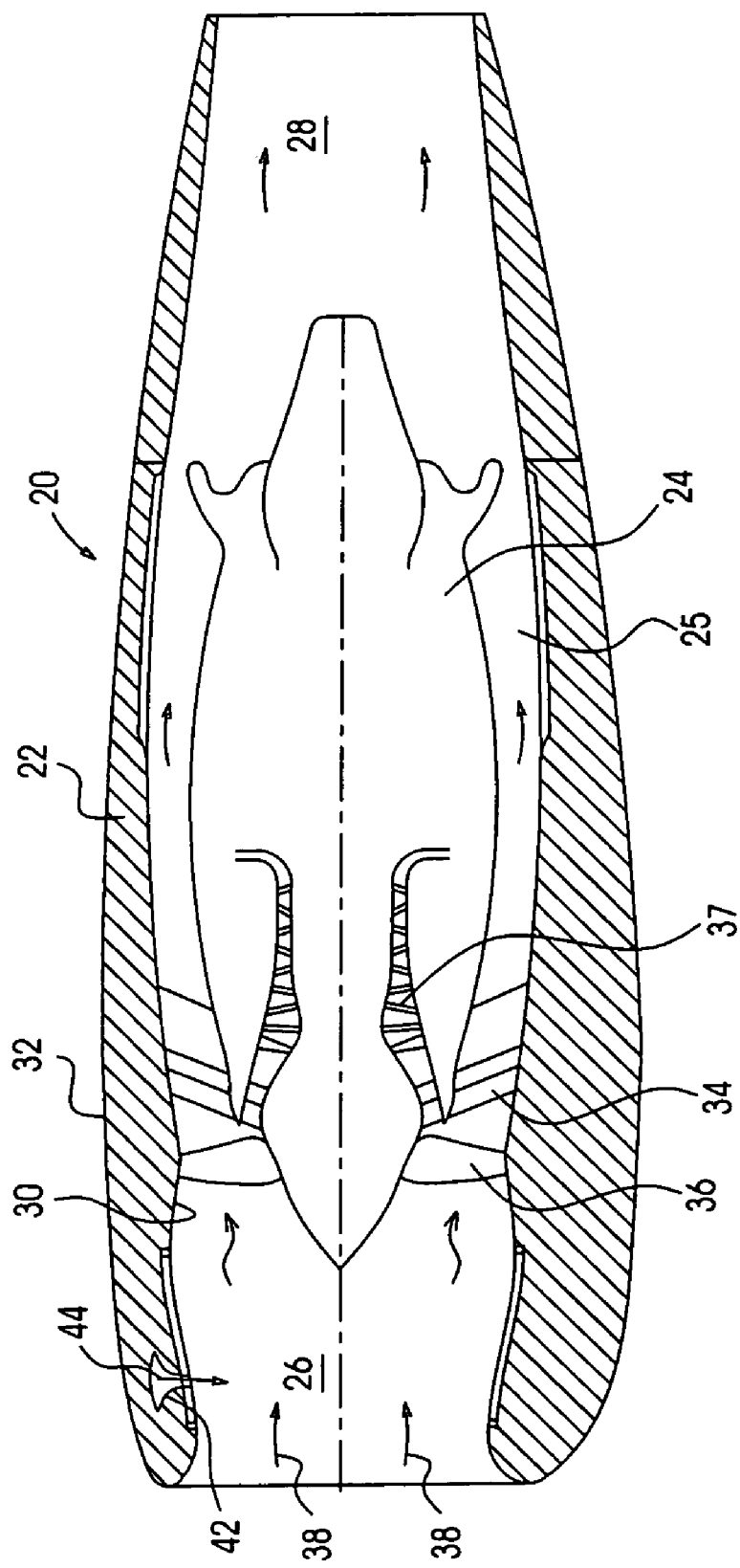
FIG. 2 is a schematical cross-sectional view of a jet engine assembly incorporating a second embodiment of the present invention.
Figure 3:
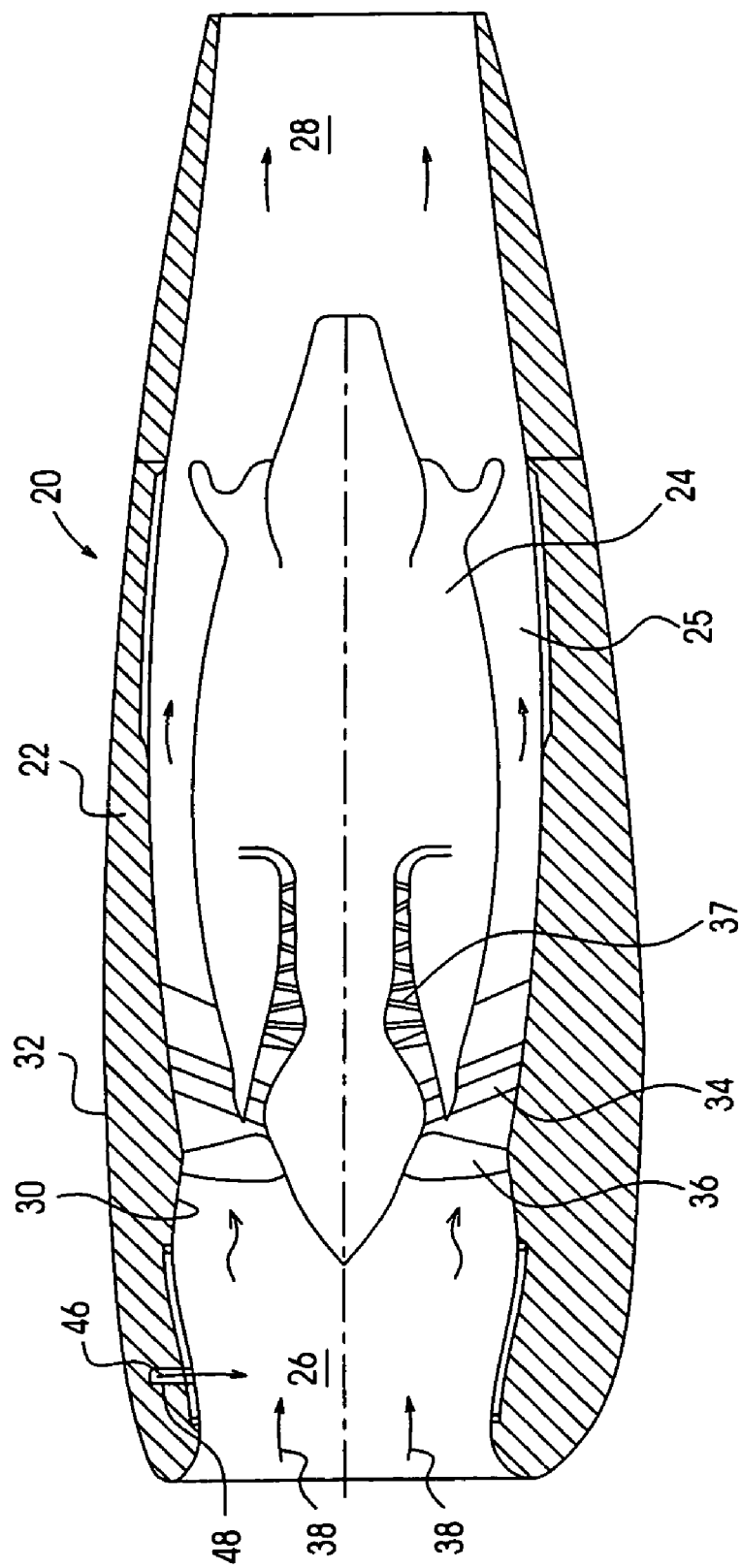
FIG. 3 is a schematical cross-sectional view of a jet engine incorporating a further embodiment of the invention.

The present invention is directed to a noise attenuation method and system for suppressing noise having a primary tone from a noise source in a duct housing. In the exemplary embodiments described below, the noise source is a jet engine surrounding by a nacelle. Many different jet engine designs are known in the art. It is contemplated that the present invention may be used to suppress the noise generated by any design of the jet engine as well as the noise generated by any source contained in a duct housing in which suppression of the noise radiation, particularly from the inlet of the engine, is desired. A jet engine assembly shown in FIGS. 1 to 3 is designated generally by reference numeral 20 which incorporates three different embodiments of the invention, illustrated in the respective drawings.

The jet engine assembly 20 has an elongated housing, also known as a nacelle 22 surrounding a jet engine 24 and radially spaced-apart therefrom to form a bypass duct 25. The nacelle 22 has a first opening at the front of the assembly 20 to form an inlet 26 of the jet engine and a second opening at the rear of the assembly 20 to form an outlet 28 of the jet engine.

Nacelle 22 has an inner wall 30 and an outer wall 32. A set of stationary stator vanes 34 are positioned between the nacelle 22 and the jet engine 24. The jet engine 24 has fan blades 36 which rotate to push air 38, which enters the inlet 26, through stator vanes 34 and the bypass duct 25, and out the outlet 28. A portion of the air pushed by the fan blades 36 enters into the engine 24 and is further compressed by compressor blades 37 to help fuel combustion in the engine.

The operation of the jet engine creates a significant amount of noise. The noise is generated primarily by pressure fluctuations on the stationary stator vanes 34 generated by flow disturbances from the rotating fan blades 36. The acoustic pressure created within the nacelle 22 by the interaction of the fan blades 36 and the stator vanes 34 varies sinusoidally in a circumferential direction around the jet engine 24. The acoustic pressure also varies radially through the nacelle 22 in a complicated pattern. The engine noise generated by the acoustic pressure variations is usually dominated by a significant tone which is the fan blade passage frequency (BPF) tone. The sound wave including the dominated BPF tone propagates via the air 38 within the nacelle 22 towards the inlet 26 and outlet 28. Without any noise attenuation system, the sound wave will propagate into the environment to create the noise dominated by the BPF tone. However, as it has been known that the BPF tone noise radiation from the inlet 26 is in a greater level than the radiation from the outlet 28, it is more desired to suppress the noise radiation from the inlet 26.

In accordance with the first preferred embodiment of the invention shown in FIG. 1, a fence member 40 is attached to the inner wall 30 of nacelle 22 at the inlet 26. It is a metal plate having a predetermined geometry and dimension adapted to be excited by the air flow 38 to generate sound waves dominated with a frequency within a desired range. The generated sound wave acts on the air flow 38 and therefore effects the propagation of the BPF tone noise, causing the frequency modulation of the BPF tone in the air 38. The fence member 40 is designed depending on different types of jet engines and there may be provided a plurality of fence members 40 spaced apart.

The frequency and amplitude of the exciting sound wave generated by the fence member is not adapted to be dynamically adjustable. However, the change of the frequency and amplitude of the exciting sound wave is not crucial to the result of noise attenuation in frequency modulation, contrasted to the change of the frequency and phase of the controlling sound wave in active noise control.

The advantage of this embodiment has a simple configuration. The fence member 40 also potentially advantageously reflects and scatters the BPF tone sound wave.

FIG. 2 illustrates a second embodiment of the present invention, in which, an aperture or a nozzle 42 is provided in the inner wall 30 of the nacelle 22 at the inlet 26. The aperture or nozzle 42 is in fluid communication with a compressed air source which may be a separate compressed air source or a chamber containing pressurized air compressed by the compressor of the jet engine. When an air flow 44 is jetted from the aperture or nozzle 42 with a high velocity into the nacelle 22, sound waves including a dominated frequency which is generally different from the frequency of the BPF tone generated by the fan blades 36 and the stator vane 34. The dominated frequency and its amplitude of the generated sound waves, is determined by the velocity of the jetted air 44, the geometry and the dimension of the aperture or nozzle 42. In this embodiment, the generated sound wave is enabled to be adjustable because the velocity of the jetted air 44 is conveniently adjustable by changing the pressure and volume of the compressed air using a fluid circuit which is well known. The aperture or nozzle 42 is also optionally to be an adjustable valve to change the geometry and dimension thereof to effect the dominated frequency and its amplitude of the generated sound waves. Contrasted to the amount of the air flow 38 from the atmosphere entering the inlet 26, the ejected air flow 44 is in a small amount which has little effect on the performance of the jet engine 24.

A third embodiment of the invention is shown in FIG. 3. Acoustic tone 46 is introduced to the inside of the nacelle 22 to excite the air flow 38 to cause the taking place of the frequency modulation of the BPF tone of the noise generated by the fan blades 36 and the stator vane 34. The acoustic tone 46 can be a loud speaker (not shown) or the like hidden behind the inner wall 30 of the nacelle 22. It is also possible to have the acoustic tone generator (not shown) positioned in a convenient place with respect to the jet engine assembly 20, and the generated acoustic tone 46 is directed, for example, by a duct through an aperture 48 defined in the inner wall 30 into the inside of the nacelle 22. The acoustic tone generator can be any type of known sound wave generators which is convenient for adjusting the parameters of the generated acoustic tone 46. Similar to the embodiment in FIG. 1, the number and position of the aperture 42 and 48 in the FIGS. 2 and 3 may vary depending on the design of the engines and other considerations.

The above-described embodiments are examples only for illustrating a system and method for noise attenuation using frequency modulation. It is will be apparent to those skilled in the art that various modifications and variations can be made in the method of manufacture of the present invention and in construction of this sound attenuation system without departing from the scope or spirit of the invention, which is intended to be limited solely by the appended claims.

The embodiments of the invention in which an exclusive property or privilege is claimed are defined as follows:

1. A method for suppressing noise dominated by a primary tone from a noise source within a duct housing comprising:

generating an exciting sound wave dominated by a primary frequency generally within an audible range and different from a frequency of the primary tone of the noise, and modulating the primary tone of the noise using the generated exciting sound wave to excite within the duct housing a fluid medium in which a sound wave of the noise propagates so that sound energy of the noise is re-distributed from the frequency of the primary tone to a broad range of side bands and the amplitude of the primary tone of the noise is reduced.

2. A method as claimed in claim 1 wherein the fluid medium is air.

3. A method as claimed in claim 1 wherein the exciting sound wave is generated by a force of a fluid flow acting on a mechanical device.

4. A noise attenuation system for suppressing noise dominated by a primary tone from a noise source comprising:

an elongated housing surrounding the noise source, the housing having a first and second openings on opposite ends, wherein a sound wave from the noise source propagates in air outwardly towards the first and second openings, an exciting sound wave generator associated with the generator generating an exciting sound wave dominated by primary frequency generally within an audible range and different from a frequency of the primary tone of the noise to excite the air and modulated the primary tone of the noise so that sound energy of the noise is re-distributed from the frequency of the primary tone to a broad range of side bands and the amplitude of the primary tone of the noise is reduced.

5. A noise attenuation system as claimed in claim 4 wherein the exciting sound wave generator is positioned on an inner wall of the housing.

6. A noise attenuation system as claimed in claim 5 wherein the exciting sound wave generator comprises a mechanical device excited by a force of air flow to generate the exciting sound wave.

7. A noise attenuation system for suppressing noise dominated by a primary tone from a jet engine comprising:

a nacelle surrounding the jet engine, the nacelle having an inlet and an outlet for receiving and exhausting air flow respectively, wherein a sound wave of the noise produced from the jet engine propagates outwardly towards the inlet and outlet; and an exciting sound wave generator associated with the nacelle, generating an exciting sound wave dominated by a primary frequency generally within an audible range and different from a frequency of the primary tone of the noise to excite the air flow in the nacelle and modulate the primary tone of the noise so that sound energy of the noise is re-distributed from the frequency of the primary tone to a broad range of side bands and the amplitude of the primary tone of the noise is reduced.

8. A noise attenuation system as claimed in claim 7 wherein the exciting sound wave generator is positioned on an inner wall of the nacelle at the inlet.

9. A noise attenuation system as claimed in claim 8 wherein the exciting sound wave generator comprises a mechanical device excited by a force of air flow to generate the exciting sound wave.

10. A noise attenuation system as claimed in claim 9 wherein the mechanical device comprises a fence member exposed to the air flow entering the inlet of the nacelle.

11. A noise attenuation system as claimed in claim 9 wherein the mechanical device comprises an aperture defined in the inner wall, an air flow jetting from the aperture into the nacelle.

* * * * *